United States Patent [19]

Ono et al.

[11] Patent Number: 4,944,475
[45] Date of Patent: Jul. 31, 1990

[54] ELECTRIC WIRE BUNDLER

[75] Inventors: Mamoru Ono; Ichiro Kudo; Toshio Okazaki, all of Aichi, Japan

[73] Assignee: Yazaki Corporation, Tokyo, Japan

[21] Appl. No.: 410,040

[22] Filed: Sep. 20, 1989

Related U.S. Application Data

[63] Continuation of Ser. No. 240,335, Sep. 16, 1988, abandoned.

[30] Foreign Application Priority Data

Sep. 4, 1987 [JP] Japan .............................. 62-134664

[51] Int. Cl.⁵ .............................................. F16L 3/03
[52] U.S. Cl. .................................... 248/71; 248/74.3; 248/68.1; 24/16 PB
[58] Field of Search ...................... 248/71, 74.3, 74.5, 248/74.2, 74.1, 68.1; 24/16 PB

[56] References Cited

U.S. PATENT DOCUMENTS

| | | | |
|---|---|---|---|
| 3,126,185 | 3/1964 | Christman | 248/74.3 |
| 3,269,680 | 8/1966 | Bryant | 248/74.3 X |
| 3,463,427 | 8/1969 | Fisher | 248/74.3 X |
| 3,515,363 | 6/1970 | Fisher | 248/71 |
| 4,572,466 | 2/1986 | Yamaguchi | 248/74.3 X |
| 4,700,913 | 10/1987 | Hirano et al. | 248/74.3 X |
| 4,705,245 | 11/1987 | Osada | 248/74.3 |
| 4,735,387 | 4/1988 | Hirano et al. | 248/71 |
| 4,766,651 | 8/1988 | Kobayashi et al. | 248/74.3 X |

FOREIGN PATENT DOCUMENTS

| | | | |
|---|---|---|---|
| 1331457 | 12/1963 | France | 248/71 |
| 2298717 | 8/1976 | France | 248/74.3 |

Primary Examiner—Alvin C. Chin-Shue
Attorney, Agent, or Firm—Sughrue, Mion, Zinn, Macpeak & Seas

[57] ABSTRACT

An electric wire bundler is disclosed in which an anchor is provided on a bottom of an electric wire rest, and a boss is provided on a top of the rest so that an end face of the boss is located at a distance from an axis of the anchor. A flexible band extends from the boss and has a plurality of engaging portions at intervals in the longitudinal direction of the band. The boss has an insertion hole, into which the band is inserted from the end face. The boss is provided with an engaging means, which is engaged with one of the engaging portions of the band inserted into the hole.

5 Claims, 4 Drawing Sheets

FIG. 1
PRIOR ART
FIG. 2
PRIOR ART
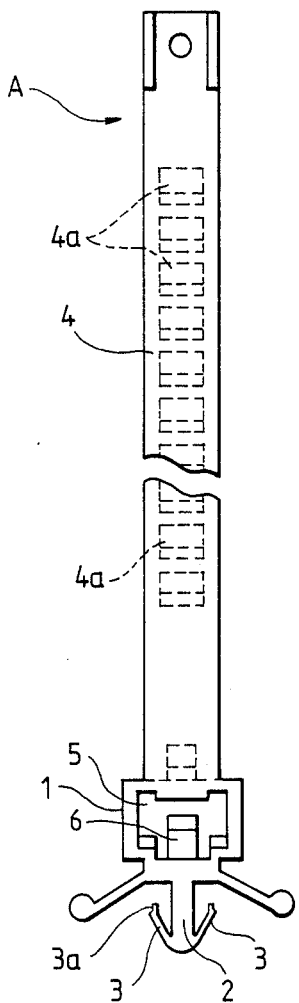
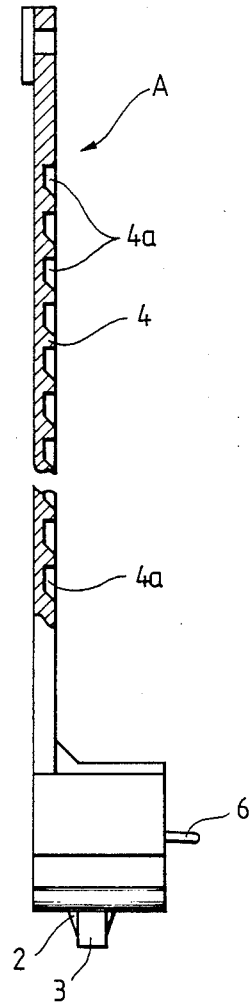

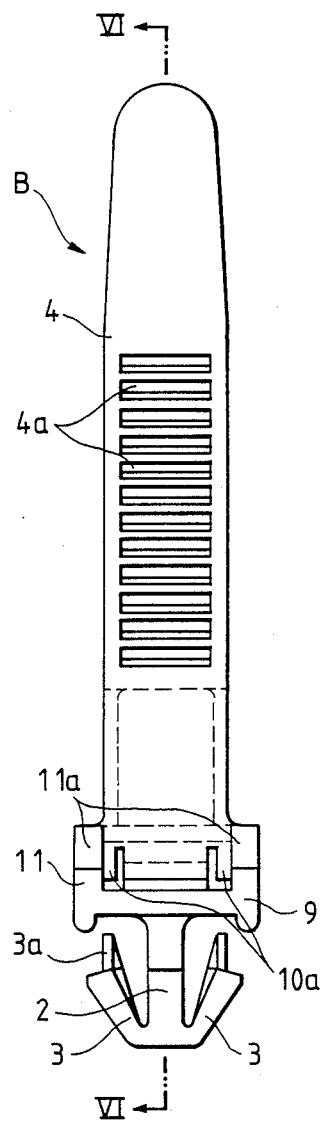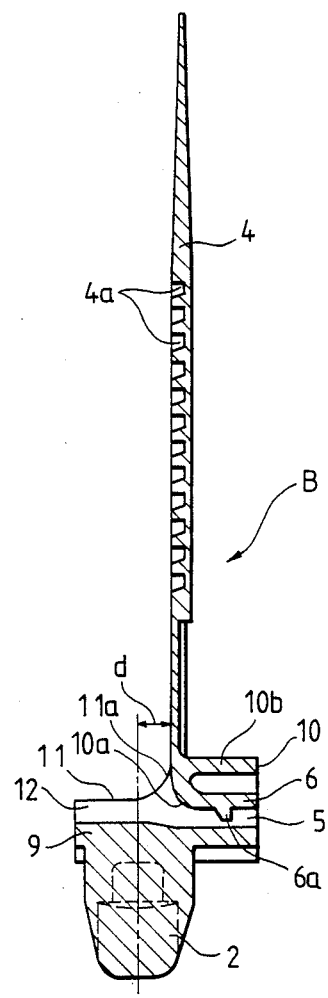

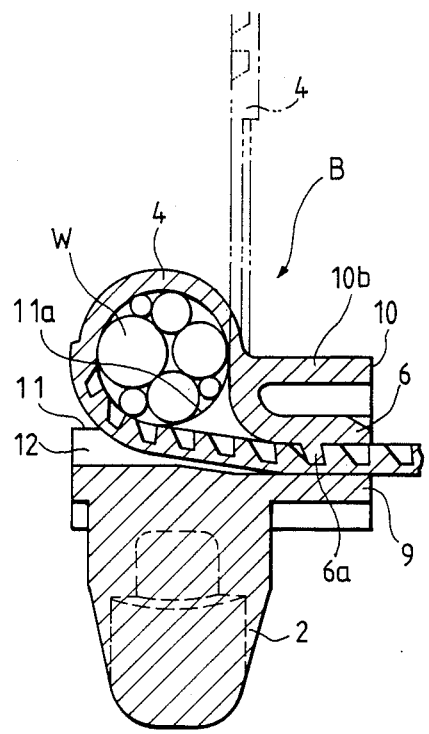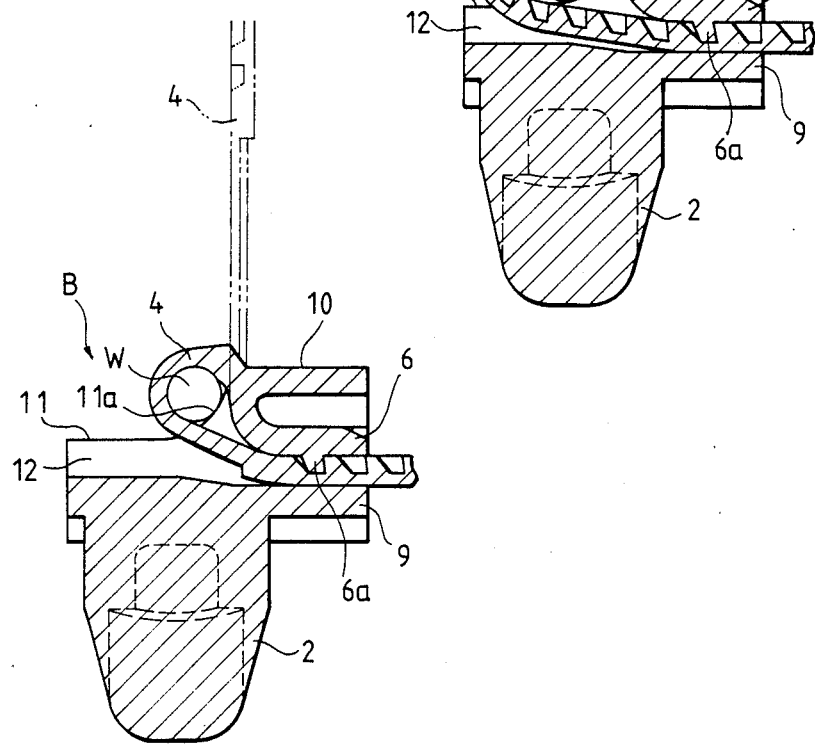

ELECTRIC WIRE BUNDLER

This is a continuation of application Ser. No. 07/240,335, filed 9/6/88, now abandoned.

BACKGROUND OF THE INVENTION

The present invention relates to an electric wire bundler for bundling electric wires and attaching them to the panel of a vehicle body or the like.

FIG. 1 shows a front view of a conventional electric wire bundler A for bundling electric wires and attaching them to the panel of a vehicle body or the like as disclosed in the Japanese Utility Model Application Laid-Open No. 69385/79. FIG. 2 shows a partially-sectional side view of the conventional electric wire bundler A. An anchor 2 projects from the bottom of the body 1 of the bundler A, and is provided with flexible engaging arms 3 at both the sides of the anchor. The engaging arms 3 have engaging notched portions 3a at the tips of the arms. When the anchor 2 is inserted into the hole of a support member such as a panel of a vehicle body, as shown in FIG. 4, the engaging arms 3 are flexed and passed through the hole so that the engaging notched portions 3a are elastically fitted in the hole to fasten the electric wire bundler A to the support member. A flexible band 4 extends from the top of the body 1 of the bundler A, and is provided with a plurality of engaging grooves 4a juxtaposed in the longitudinal direction of the band. The central portion of the body 1 has an insertion hole 5, into which the band 4 is inserted. An engaging arm 6 having a projection 6a, which is engaged in one of the engaging grooves 4a of the band 4, is provided in the insertion hole 5 so that the engaging arm functions as an engaging means which does not hinder the band from being inserted into the insertion hole 5 but is engaged with the inserted band to prevent the band from being moved in the direction reverse to that of the insertion of the band into the hold. When the band 4 is to be taken out of the insertion hole 5, the tip 6b of the engaging arm 6 is pushed to flex the arm to disengage the projection 6a out of the engaging groove 4a of the band. Guide projections 7 are provided at both the side edges of the tip of the band 4 so that the guide projections are fitted in grooves 8 provided in the body 1 along the insertion hole 5, and guide the band as it is inserted into the insertion hole.

The use of the electric wire bundler a is described from now on. Electric wires W are first surrounded by the band 4. The tip of the band 4 is then inserted into the insertion hole 5 of the body 1 of the bundler A, and pulled through the hole so that the electric wires are tightly bundled and the engaging projection 6a of the engaging arm 6 is engaged in one of the engaging grooves 4a of the band to keep the electric wires tightly bundled. After that, the anchor 2 of the bundler a is fitted into the hole of the support member so that the electric wires are attached to the support member by the bundler, as shown in FIG. 4.

Because of the distance l between the axis of the anchor 2 of the conventional electric wire bundler a and the center of the bundle of the electric wires W and the weight of the wires or an external force F thereon, torque Fl acts to the anchor so that the anchor is likely to undergo damage, coming-off from the support member or the like.

Since the electric wires W are not all tightly bundled by the band 4, the electric wires are likely to move or shift inside the band.

SUMMARY OF THE INVENTION

The present invention was made in order to solve the above-mentioned problems of the conventional electric wire bundler.

Accordingly, it is an object of the present invention to provide an electric wire bundler in which the torque which acts to an anchor is minimized to prevent the anchor from being damaged or coming off and electric wires bundled by a flexible band are kept from being displaced. In the electric wire bundler, the anchor is provided on the bottom of an electric wire rest, and a boss is provided on the top of the rest so that the end face of the boss is located at a distance from the axis of the anchor. The flexible band extends from the boss, and has a plurality of engaging portions at intervals in the longitudinal direction of the band. The boss has an insertion hole, into which the band is inserted from the end face of the boss. The boss is provided with an engaging means, which is engaged with one of the engaging portions of the band inserted into the insertion hole. Curbs for holding the electric wires are provided on the top of the electric wire rest.

The electric wires are tightly bundled by the band of the electric wire bundler provided in accordance with the present invention, so that the electric wires are pushed toward the end face of the boss at the inlet end of the insertion hole thereof. Since the end face of the boss at the inlet end of the insertion hole thereof is located at the distance from the axis of the anchor in the direction of the insertion of the band into the hole, the distance between the center of the bundle of the electric wires and the axis of the anchor is very small. For that reason, the torque which acts to the anchor due to the weight of the electric wires, an external force thereon or the like is minimized. Since the electric wires are pushed on the curbs of the electric wire rest, the electric wires are prevented from playing or being displaced.

BRIEF DESCRIPTION OF THE DRAWINGS

FIG. 1 shows a front view of a conventional electric wire bundler;

FIG. 2 shows a partially-sectional side view of the conventional electric wire bundler;

FIG. 5 shows a front view of an electric wire bundler which is an embodiment of the present device;

FIG. 6 shows a sectional view of the electric wire bundler along a line VI—VI of FIG. 5;

FIG. 7 shows a sectional view of the electric wire bundler holding a large-diameter bundle of electric wires; and FIG. 8 shows a sectional view of the electric wire bundler holding a small-diameter bundle of electric wires.

DESCRIPTION OF THE PREFERRED EMBODIMENTS

Figure 3:
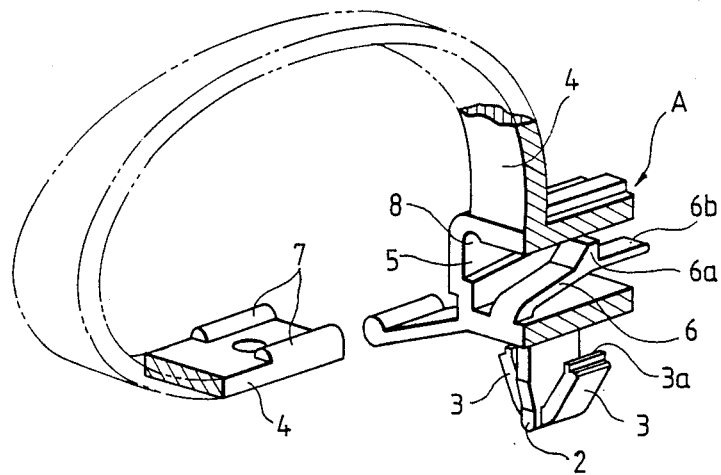
FIG. 3 shows a partially-sectional perspective view of the conventional electric wire bundler.
Figure 4:
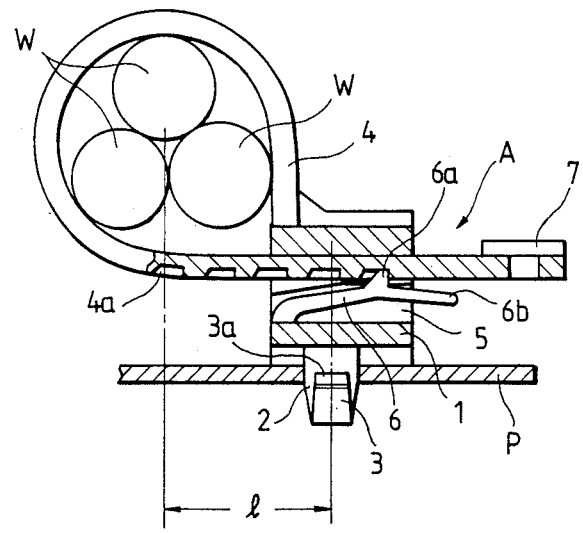
FIG. 4 shows a partially-sectional side view of a major part of the conventional electric wire bundler holding a bundle of electric wires.

An embodiment of the present invention, which is an electric wire bundler, is hereafter described with reference to the drawings attached hereto. The mutually corresponding portions of the electric wire bundler and the above-mentioned conventional electric wire bundler are denoted by the same reference symbols herein.

FIGS. 5 and 6 show the electric wire bundler B in accordance with the embodiment. In the bundler B, an anchor 2 is provided on the bottom of an electric wire rest 9. A boss 10 is provided on the top of the electric wire rest 9, and has an end face 10a at a distance d from the axis of the anchor 2. An insertion hole 5 extends through the boss 10 from the end face 10a thereof. A band 4 extends from the top 10b of the boss 10 opposite the anchor 2. An engaging arm 6, which functions as a means for engaging the band 4, is provided in the insertion hole 5, and has a projection 6a, which is engaged in one of the engaging grooves 4a of the band 4 in the same manner as the conventional electric wire bundler. The distance d is nearly equal to the radius of a bundle of bundler-tightened electric wire W so that the center of the bundle of the electric wires tightly bundled on the end face 10a of the boss 10 by the band 4 is located nearly on the axis of the anchor 2. For that reason, the torque which acts to the anchor 2 due to the weight of the electric wires W or an external force thereon is minimized. Two curbs 11 for tightly bundling the electric wires W are provided on the electric wire rest 9 opposite the anchor 2 so that a groove 12 is defined between the curbs. The width of the groove 12 is larger than that of the band 4 so that the band being inserted into the insertion hole 5 does not interfere with the curbs 11. The height of each of the curbs 11 is gradually increased from the vicinity of the axis of the anchor 2 toward the end face 10a of the boss 10 so that the tops of the curbs are provided with curved portions 11a continuous to the end face 10a.

The electric wires W are tightly bundled by the electric wire bundler B as shown in FIG. 7 if the diameter of the bundle of the electric wires is relatively large, or as shown in FIG. 8 if the diameter of the bundle of the wires is relatively small. As a result, the electric wires W are pushed toward the curved portions 11a of the curbs 11 so that all the electric wires are tightly held by the band 4 and the curbs, regardless of the number of the electric wires and the diameter of the bundle thereof. The electric wires W are thus prevented from playing or being displaced.

According to the present invention, electric wires are all tightly bundled by an electric wire rest and a band so that the wires are prevented from being displaced unlike the prior art. Since the electric wires are pushed on wire holding curbs, the wires are located on or near the axis of an anchor so that the torque which acts to the anchor is minimized. For that reason, the anchor is prevented from being damaged or coming off as in the conventional art.

We claim:

1. An electric wire bundler for fixing at least one electric wire to a base support, comprising:
   an electric wire rest on which said electric wire is to be supported;
   an anchor for engaging with a portion of said base support, said anchor being disposed on a side of said wire rest and extending substantially perpendicularly therefrom, said anchor having a longitudinal axis extending therealong which is substantially aligned with said electric wire rest;
   a boss provided on another side of said electric wire rest, said boss having an insertion hole disposed perpendicular to said longitudinal axis of said anchor, an engaging arm with a projection thereon provided in said insertion hole and a first end wall facing said longitudinal axis of said anchor, said first end wall being displaced from said longitudinal axis of said anchor by a predetermined distance, and wherein said engaging arm extends downwardly from said first end wall and curves around into said insertion hole; and
   a flexible band extending from a top surface of said boss along said first end wall thereof parallel to said longitudinal axis of said anchor and having a plurality of engaging portions at intervals in a longitudinal direction thereof, said flexible band being insertable into said insertion hole of said boss such that one of said engaging portions engages said projection on said engaging arm of said boss so as to secure said at least one electric wire to said bundler, wherein the center of said at least one electric wire is substantially aligned with said longitudinal axis of said anchor.

2. The bundler according to claim 1, wherein said electric wire rest has a pair of parallel curbs to define therebetween a guide groove for said flexible band.

3. The bundler according to claim 2, wherein each of said curbs has a height that is gradually increased toward said first end wall of said boss such that curved surfaces are formed.

4. The bundler according to claim 2, wherein the one of said engaging portions engages said projection on said engaging arm at a position which is lower in height than all points on curved surfaces of said parallel curbs.

5. The bundler according to claim 4, wherein said flexible band and the curved surfaces of said parallel curbs form a circle when a plurality of electric wires are bundled therein, such that said flexible band and said parallel curbs tightly and securely circumscribe said plurality of electric wires.

* * * * *